United States Patent Office 3,705,912
Patented Dec. 12, 1972

3,705,912
PREPARATION OF ALCOHOLS
Stephen N. Massie, Palatine, Ill., assignor to Universal Oil Products Company, Des Plaines, Ill.
No Drawing. Filed Mar. 22, 1971, Ser. No. 127,030
Int. Cl. C07c 169/54
U.S. Cl. 260—397.2                 9 Claims

ABSTRACT OF THE DISCLOSURE

Alcohols may be prepared by the hydration of olefinic compounds utilizing a catalyst comprising a hexavalent molybdenum compound.

This invention relates to a process for the preparation of alcohols and particularly to a process for the hydration of olefinic compounds utilizing a specific type of catalyst which is hereinafter set forth in greater detail.

Alcohols, as is well-known, are important chemical compounds which are utilized in many and various ways in the industrial world. For example, isopropyl alcohol is utilized in the manufacture of acetone which is a source of acetic anhydride, diacetone alcohol, methyl isobutyl ketone, and other derivatives. In addition it is also used as a solvent for essentials and oils, alkaloids, gums, resins, and for organic and inorganic compounds. Other uses for this important chemical include being used as an anti-stalling agent in liquid fuels or as a de-icing agent in liquid fuels as well as being an intermediate in the preparation of pharmaceuticals, perfumes, lacquers, etc. Another alcohol, namely, t-butyl alcohol, which may be prepared according to the process of this invention will find the use as a solvent and in other organic synthesis. Likewise, ethyl alcohol which is a fairly common compound may be used in the manufacture of dyes, synthetic drugs, synthetic rubbers, detergents, cleaning solutions, cosmetics, pharmaceuticals, explosives, rocket fuel, and many synthetic uses too numerous to mention.

In addition to preparing alcohols of the type set forth in the preceding paragraph, the catalytic compositions of matter which are used in the hydration process of this invention will be extremely useful for delicate hydration processes where the structure of the olefinic compound or the substituents already on the molecule are not to be disturbed. This is in contradistinction to other prior art hydration catalysts such as the mineral acids which are severe in nature and would tend to disturb such structure as steroids or olefinic compounds containing substituents which are likely to be split-off when subjecting these molecules to hydration at elevated temperatures in the presence of the aforementioned mineral acids.

It is therefore an object of this invention to provide a process for preparing alcohols.

A further object of this invention is to provide a process for the hydration of olefinic compounds to prepare useful commercial products.

In one aspect an embodiment of this invention resides in a process for the hydration of olefinic compounds which comprises treating an olefinic compound with water in the presence of a catalyst comprising a hexavalent molybdenum compound at hydration conditions, and recovering the resultant hydrated compound.

A specific embodiment of this invention is found in a process for the hydration of olefinic compounds which comprises treating propene with water in the presence of molybdenum (VI) oxalate at a temperature in the range of from 0° to about 300° C. and a pressure in the range of from about atmospheric to about 2,000 pounds per square inch, and recovering the resultant 2-propanol.

Other objects and embodiments will be found in the following further detailed description of the present invention.

As hereinbefore set forth the present invention is concerned with a process for the hydration of olefinic compounds by treating said olefinic compounds with water in the presence of certain catalytic compositions of matter. These catalytic compositions of matter will comprise hexavalent molybdenum compounds, the use of said catalyst enabling the hydration process to be effected without a rearrangement of the compound undergoing hydration or a split-off of any susceptible substituents attached thereto. The hydration reaction will be effected under hydration conditions which include temperatures in the range of from about 0° to about 300° C., preferably in a range of from ambient (about 25° C.) up to about 200° C., and at a pressure ranging from atmospheric to about 2,000 pounds per square inch. In the event that superatmospheric pressures are to be employed in this reaction, the pressures are forwarded by the introduction of an oxygen-containing gas such as air or oxygen or a substantially inert gas such as nitrogen into the reaction zone, the amount of pressure which is used being that which is sufficient to maintain a major portion of the reactants in the liquid phase. The olefin is treated with a mol excess of water, said water being present in the reaction zone in a ratio of from 1.5:1 to about 10:1 mols of water per mol of olefinic compound. When utilizing a diolefinic compound of the type hereinafter set forth in greater detail, it is necessary to have a larger excess of water than is normally present in the hydration of mono-olefinic compounds inasmuch as the hydration of a diolefinic compound will result in the formation of polyhydroxy compounds. It is also envisaged that since the reactivities of different olefinic bonds in a polyolefinic compound may be quite different, it would be possible, if desired, to hydrate one or more olefinic bonds and leave others unreacted by proper adjustment of reaction parameters.

Examples of catalytic compositions of matter comprising hexavalent molybdenum compounds which may be utilized in the process of this invention will include ammonium molybdate, barium molybdate, cadmium molybdate, calcium molybdate, copper molybdate, lead molybdate, lithium molybdate, magnesium molybdate, manganese molybdate, nickel molybdate, potassium molybdate, sodium molybdate, strontium molybdate, zinc molybdate, zirconium molybdate, etc. In addition, complexes of the molybdenum compounds with polybasic organic acids and polyhydroxyl compounds as well as complexes of molybdenum and β-diketones such as molybdenum (VI) oxalate, molybdenum (VI) lactate, molybdenum (VI) malate, molybdenum (VI) tartrate, molybenum (VI) tartramate, molybdenum (VI) citrate, molybdenum (VI) citramalate, molybdenum (VI) isocitrate, molybdenum (VI) muscate, molybdenum (VI) salicylate, molybdenum (VI) acetylacetonate, etc. The criterion of the catalyst is that the molybdenum is in a hexavalent state.

Examples of olefinic compounds which are undergoing hydration according to the process of this invention will comprise those olefins containing from 2 to about 30 carbon atoms and includes both mono- and polyolefinic compounds. Some specific examples of these olefins which are treated with water will include straight and branched chain mono- and polyolefins such as ethylene, 1-butene, 2-butene, 1-pentene, 2-pentene, 1-hexene, 2-hexene, 3-hexene, 1-heptene, 2-heptene, 3-heptene, 1-octene, 2-octene, 3-octene, 4-octene, 1-nonene, 2-nonene, 3-nonene, 4-nonene, 1-decene, 2-decene, 3-decene, 4-decene, 5-decene, 3-methyl-1-butene, 3-methyl-1-pentene, 3-methyl-2-pentene, 3-methyl-1-hexene, 3-methyl-1-heptene, 4-methyl-2-heptene, 3-methyl-1-octene, 1,3-butadiene, 1,3-pentadiene, 1,3-hexadiene, 2,4-hexadiene, 1,3-heptadiene, 2,4-heptadiene, 1,3-octadiene, 2,4-octadiene, 4-methyl-1,3-hexadiene, etc.; aromatic compounds containing an unsaturated side chain such as styrene, 3-phenylpropene-1, 4-phenylbutene-1, 5-phenylpentene-1, 6-phenylhexene-1, etc. In addition, it is also contemplated within the scope of this invention that steroids and similar compounds such as cholesterol, stigmasterol, ergosterol, etc., may also undergo hydration utilizing a catalyst of the type hereinbefore set forth in greater detail.

The process of this invention may be effected in any suitable manner and may comprise either a batch or continuous type operation. For example, when a batch type operation is used, a quantity of the olefinic hydrocarbon, if in liquid form, is placed in an appropriate apparatus along with water, which is used as the hydration agent and a catalytic amount of the hexavalent molybdenum compound. In the event that the olefin is in gaseous form such as when hydrating propene, butene-1, butene-2, etc., the reaction vessel will comprise an autoclave or other pressure-resistant vessel whereby the olefin is charged to the sealed vessel containing the catalyst and water. If pressures greater than autogenetic are to be employed, a substantially inert gas such as nitrogen or an oxygen-containing gas such as air is also charged to the reactor which is thereafter heated to the desired temperature. The reaction is maintained at the predetermined operating temperature for a residence time which may range from about 0.5 up to about 20 hours or more in duration. Upon completion of the aforementioned residence time, heating or cooling is discontinued, the reactor allowed to return to room temperature. The excess pressure, if any, is discharged, the reactor is opened and the reaction mixture is recovered therefrom. After separation from the catalyst, the liquid mixture is subjected to conventional means of purification such as washing, drying, distillation, crystallization, etc., whereby the desired alcohol is separated from water, unreacted starting materials and/or unwanted side products which may have formed, and recovered.

It is also contemplated within the scope of this invention that the hydration process may be effected in a continual manner. When such a type of operation is used, the reactor containing the hexavalent molybdenum compound catalyst is maintained at the proper operating conditions of temperature and pressure. The olefinic charge stock and the water are continuously charged to the reactor through separate lines, or if so desired, they may be admixed prior to entry into said reactor and passed thereto in a single stream. After completion of the desired residence time, the reactor effluent is continuously withdrawn and subjected to conventional means of separation whereby the desired alcohol is recovered and passed to storage, while any unreacted starting material may be recycled to form a portion of the feed stock.

If the catalyst is in solid form, various types of continuous manner of operation may be employed. One such type is the fixed bed operation in which the catalyst is maintained as a fixed bed in the reactor and the reactants are passed therethrough in either an upward or downward flow. Another type operation is the moving bed method in which the catalyst and the reactants are passed through the reactor either concurrently or counter-currently to each other, or the slurry type of operation in which the catalyst is carried into the reactor as a slurry in one or both of the reactants.

The following examples are given to illustrate the process of the present invention which, however, are not intended to limit the generally broad scope of the present invention in strict accordance therewith.

EXAMPLE I

In this example 1.0 g. of a catalyst comprising molybdenum (VI) oxalate and 40.0 g. of water were placed in the glass liner of a rotating autoclave. The autoclave was sealed and 42.0 g. of propylene was charged thereto. Following this an additional amount of air was charged to the autoclave so that an initial operating pressure of 675 pounds per square inch was reached. The autoclave was then heated to a temperature of 140° C. and maintained thereat for a period of 16 hours, the maximum pressure during this reaction period reaching 1,240 pounds per square inch. At the end of the 16 hour period, heating was discontinued and the autoclave was allowed to return to room temperature, the final pressure at room temperature being 670 pounds per square inch. The excess pressure was discharged and the autoclave was opened. The reaction mixture was recovered and subjected to conventional means of separation, the desired product comprising 2-propanol (isopropyl alcohol) being recovered therefrom.

EXAMPLE II

To the glass liner of a rotating autoclave is added 40.0 g. of water and 1.0 g. of a catalyst comprising molybdenum (VI) oxalate. The autoclave is sealed and 40.0 g. of isobutylene is charged thereto. Upon completion of the addition of the isobutylene an additional amount of air is charged so that an initial operating pressure of 600 pounds per square inch is reached. The autoclave is then heated to a temperature of 150° C. and maintained thereat for a period of 4 hours. Upon completion of this residence time, heating is discontinued and the autoclave allowed to return to room temperature. The excess pressure is then discharged, the autoclave is opened, and the reaction mixture is recovered therefrom. After conventional means of separation including washing, drying, fractional distillation under reduced pressure, the desired product comprising t-butyl alcohol is recovered.

EXAMPLE III

A mixture comprising 80.0 g. of 1-decene, 1.0 g. of a catalyst comprising molybdenum (VI) fluoride and 40.0 g. of water is placed in the glass liner of a rotating autoclave. The autoclave is sealed and nitrogen pressured thereto until an initial operating pressure of 525 pounds per square inch is reached. The autoclave and contents thereof are then heated to a temperature of 150° C. and maintained thereat for a period of 4 hours. Upon completion of the 4 hour period, heating is discontinued and the autoclave is allowed to return to room temperature. The excess pressure is discharged, the autoclave is opened and the reaction mixture is recovered therefrom. After conventional means of separation and purification have been completed, the desired product comprising 2-decanol is recovered.

EXAMPLE IV

To the glass liner of a rotating autoclave is added 60.0 g. of styrene, 40.0 g. of water and 1.0 g. of a catalyst comprising molybdenum (VI) oxalate. The autoclave is sealed and thereafter a sufficient amount of nitrogen is charged thereto so that an initial operating pressure of 525 pounds per square inch is reached. The autoclave is then heated to a temperature of 150° C. and maintained thereat for a reaction period of 8 hours. Upon completion of the desired residence time, heating is discontinued, the autoclave allowed to return to room temperature, the excess pressure is discharged and the autoclave is opened. The reaction mixture is subjected to conventional means of separation and purification whereby the desired product comprising α-phenylethyl alcohol is recovered.

EXAMPLE V

To a mixture of 40.0 g. of water and 1.0 g. of a catalyst comprising molybdenum (VI) oxalate is added 10.0 g. of cholesterol. The autoclave is sealed and nitrogen is pressured thereto until an initial operating pressure of 525 pounds per square inch is reached. The autoclave and contents thereof are heated to a temperature of 140° C. and maintained thereat for a residence time of 6 hours. Upon completion of the aforementioned 6 hour period, heating is discontinued, the autoclave is allowed to return to room temperature and the excess pressure is discharged. After removal of the reaction mixture from the autoclave and subjecting said mixture to conventional means of separation, the desired product comprising a mixture of 5,6-dihydro-5-hydroxycholesterol and 5,6-dihydro-6-hydroxycholesterol is recovered.

I claim as my invention:

1. A process for the hydration of an olefinic compound selected from the group consisting of olefins of from 2 to about 30 carbon atoms, aromatic compounds containing an unsaturated side chain, and steroids, which comprises reacting said olefinic compound with water in the presence of a hexavalent molybdenum compound at a hydrating temperature in the range of from about 0° to 300° C. and a pressure in the range of from about atmospheric to about 2,000 pounds per square inch, and recovering the resultant hydrated compound.

2. The process of claim 1 in which said olefinic compound is an olefin of from 2 to about 30 carbon atoms.

3. The process as set forth in claim 1 in which said molybdenum compound is molybdenum (VI) oxalate.

4. The process as set forth in claim 1 in which said molybdenum compound is molybdenyl acetylacetonate.

5. The process as set forth in claim 1 in which said olefinic compound is propene and said hydrated compound is 2-propanol.

6. The process as set forth in claim 1 in which said olefinic compound is isobutylene and said hydrated compound is t-butyl alcohol.

7. The process as set forth in claim 1 in which said olefinic compound is 1-decene and said hydrated compound is 2-decanol.

8. The process as set forth in claim 1 in which said olefinic compound is styrene and said hydrated compound is α-phenylethyl alcohol.

9. The process as set forth in claim 1 in which said olefinic compound is cholesterol and said hydrated compound is a mixture of 5,6-dihydro-5-hydroxycholesterol and 5,6-dihydro-6-hydroxycholesterol.

No references cited.

ELBERT L. ROBERTS, Primary Examiner

U.S. Cl. X.R.

260—618, 641